United States Patent [19]

Christopher

[11] Patent Number: 5,043,813
[45] Date of Patent: Aug. 27, 1991

[54] DISPLAY LOCKED TIMING SIGNALS FOR VIDEO PROCESSING

[75] Inventor: Todd J. Christopher, Indianapolis, Ind.

[73] Assignee: Thomson Consumer Electronics, Inc., Indianapolis, Ind.

[21] Appl. No.: 499,123

[22] Filed: Mar. 26, 1990

[51] Int. Cl.$^5$ ............................................... H04N 5/04
[52] U.S. Cl. .................................. 358/148; 358/159; 358/158
[58] Field of Search ................. 358/11, 140, 148, 149, 358/150, 158, 181, 159

[56] References Cited

U.S. PATENT DOCUMENTS 4,639,780  1/1987  Willis .................................. 358/150
4,831,441  5/1989  Ando ..................................... 358/11

Primary Examiner—James J. Groody
Assistant Examiner—David E. Harvey
Attorney, Agent, or Firm—Joseph S. Tripoli; Joseph J. Laks; Harvey D. Fried

[57] ABSTRACT

A circuit for receiving a video signal with a horizontal synchronizing component at a horizontal scanning frequency generates an intermediate synchronizing signal synchronized with the horizontal synchronizing component. A horizontal deflection circuit generates horizontal deflection current synchronized with the intermediate synchronizing signal. An oscillator generates a display locked clock signal synchronously with a clock synchronizing signal derived from the horizontal deflection current. A counter divides the clock signal, producing decodable outputs. A decoding circuit generates display locked timing signals, at the frequency of the horizontal synchronizing component and at the frequency of the intermediate signal, from the outputs of the counter. Where the frequency of the intermediate signal is a multiple of the frequency of the horizontal synchronizing component, for example by a factor of two, a circuit coupled to the counter and the decoding circuit associates certain pulses of the display locked clock signal with commencement of video line intervals in the video signal.

27 Claims, 6 Drawing Sheets

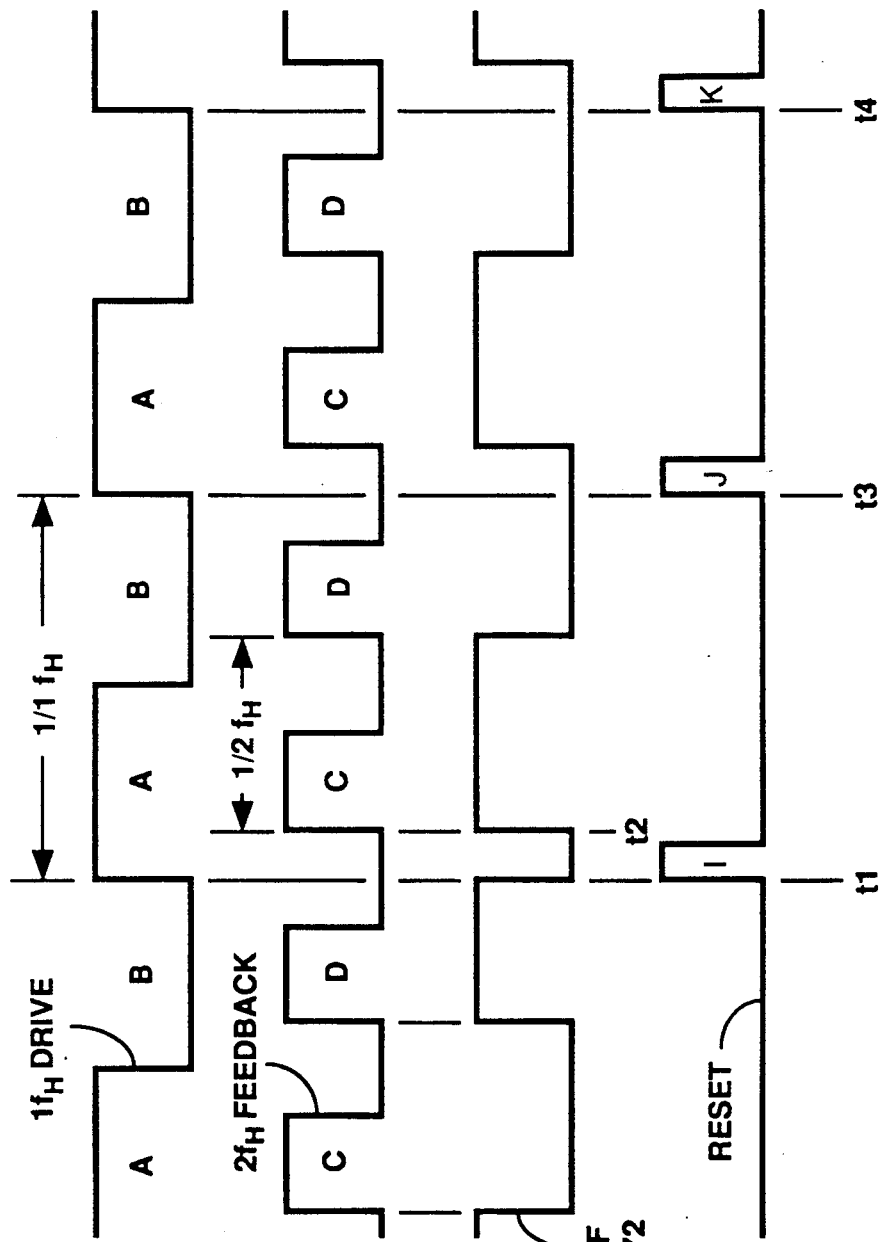

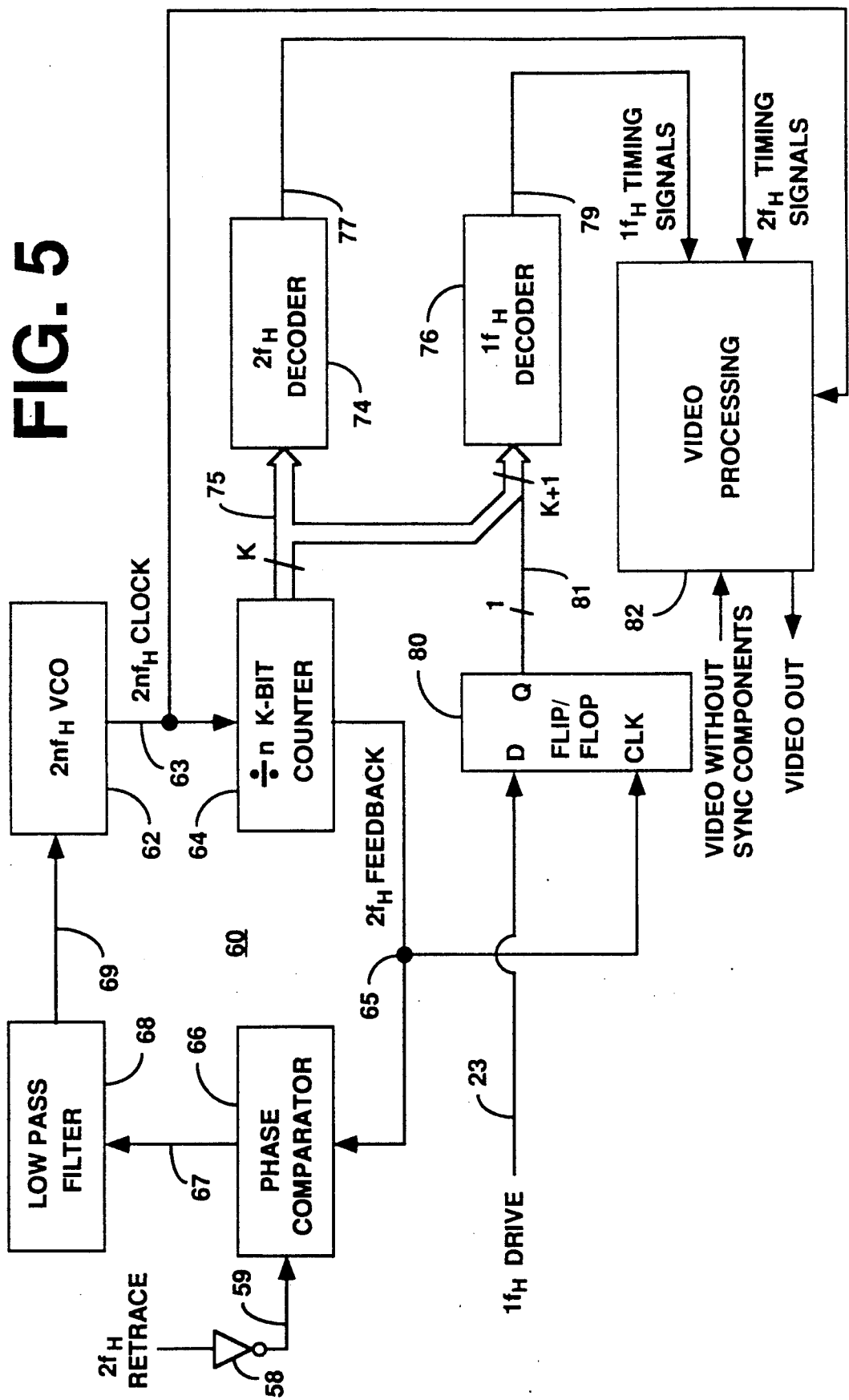

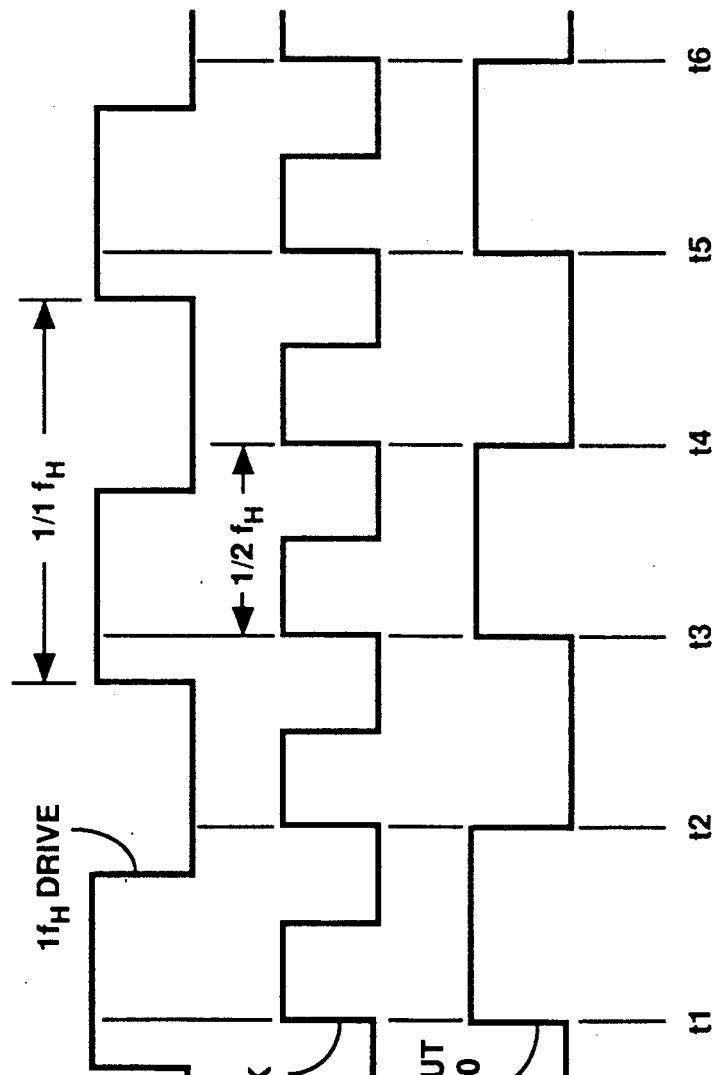

DISPLAY LOCKED TIMING SIGNALS FOR VIDEO PROCESSING

This invention relates to a system for providing precise timing signals for video processing, for example video speedup circuits and/or digital processing in general. The timing signals can be at the same frequency or at different frequencies, for example $f_H$ and $nf_H$, an integral multiple of $f_H$. The timing signals can be synchronized respectively with an incoming video signal and with a signal derived, for example, from an output signal of the horizontal deflection circuit, such as a signal derived from the horizontal deflection current.

Television apparatus require that the circuits generating the raster scan be synchronized with the video signal being displayed. Standard NTSC video signals, for example, are displayed by interlacing successive fields, each field being generated by a raster scanning operation at a basic or standard horizontal scanning rate of approximately 15,734 Hz.

The basic scanning rate for video signals is variously referred to as $f_H$, $1f_H$, and 1H. The actual frequency of a $1f_H$ signal will vary according to different video standards. In accordance with efforts to improve the picture quality of television apparatus, systems have been developed for displaying video signals progressively, in a noninterlaced fashion. Progressive scanning requires that each displayed frame must be scanned in the same time period allotted for scanning one of the two fields of the interlaced format. Accordingly, the horizontal scanning frequency must be twice that of the interlaced video signals. The scanning rate for such progressively scanned displays is variously referred to as $2f_H$ and 2H. A $2f_H$ scanning frequency according to standards in the United States, for example, is approximately 31,468 Hz. An unspecified multiple rate may be referred to, for example, as $nf_H$ where n is an integer greater than 1.

A problem that can be encountered in video processing and deflection systems, for example in progressive scanning systems, is that some video processing must must be performed on the incoming interlaced video signal at $1f_H$, whereas other video processing must be performed on the displayed video signal at the faster progressive rate, for example $2f_H$. Both $1f_H$ and $2f_H$ timing signals must be provided. In a digital television receiver or video recorder, for example, incoming video signals are digitized for signal processing. After conversion, the incoming video must be written into storage means, for example a shift register and/or buffer, at the $1f_H$ rate. Video output signals, however, must be read out of the storage means at the faster rate, for example $2f_H$. Blanking signals are another example of a necessary $2f_H$ timing signal. The timing signals used for video processing must not only be synchronized with one another, but must be synchronized with the incoming video signal and with the beginning of video trace. Problems in properly synchronizing the video/raster phasing and the timing signals can result in distortion of the picture which, for example, might become uncentered or evidence a split raster. Typically, the video information is received by the television apparatus one line at a time, at a first or basic horizontal scanning rate, for example $1f_H$. In a progressive scanning system, for example, the video information may be stored, one or more lines at a time, prior to being displayed at the $2f_H$ rate. Sometimes, each line is read out, or displayed, more than once. Sometimes, the information in successive lines, or sets of lines, is processed, for example, by being combined by interpolation. In either event, the larger number of lines of video information must be displayed at a faster rate, for example, $2f_H$.

Accordingly, it is necessary to generate $1f_H$ and $2f_H$ timing signals for use in an interlaced to progressive scan conversion circuit in a progressive scan television receiver. Moreover, it is very important that the $2f_H$ signals have minimal $1f_H$ modulation on their periods, sometimes referred to as $1f_H$ ripple or jitter. Further, it is particularly convenient if both the $1f_H$ and $2f_H$ timing signals are derived from the same clock oscillator. In the past, a line locked clock, or oscillator, has been employed for generating such timing signals. Line locked is a term generally understood to denote an operating condition wherein an oscillator or clock is synchronized with, that is locked to, the horizontal synchronizing pulses of an incoming interlaced video signal. Certain jitter conditions, even in a $1f_H$ system, without a video speedup circuit, can result in misregistration of the beginning of the video line and the beginning of horizontal trace, notwithstanding implementation of a conventional line locked clock for controlling video processing. However, if the $2f_H$ deflection circuit is synchronized with the video signal by a source other than directly, for example by the horizontal synchronizing component of the incoming video signal, and if there is negligible $1f_H$ ripple in the deflection circuit, then a master clock oscillator for generating the $1f_H$ and $2f_H$ timing signals can be locked to the $2f_H$ deflection circuit without introducing a $1f_H$ ripple component into the $1f_H$ and $2f_H$ timing signals. Similarly, in a $1f_H$ system without progressive scanning, a video processing circuit can have certain video features requiring, for example, digital processing of the video signal. Such a video processing circuit can require video signals to be written into a memory and stored temporarily, prior to being read out of memory onto the television or monitor screen. In this case, the video lines must be written into memory in synchronism with the incoming video signal, but the video lines must be read out of memory in synchronism with the horizontal deflection circuit. When a conventional line locked clock is synchronized to the incoming video signal, various jitter conditions in the deflection circuit, for example phase variations of retrace pulses caused by variations in beam current loading, can disturb the registration, or time coincidence, of the beginning of each horizontal trace and the beginning of the video line being scanned.

In accordance with an aspect of this invention, a new kind of master clock is defined, namely one which is locked to an output display control signal, for example, an output signal of the deflection circuit, such as the horizontal deflection current or a signal derived therefrom. Such a clock is referred to herein as a display locked clock, or oscillator, to differentiate from a conventional line locked clock, or oscillator. A display locked clock or oscillator is useful in any system where the beginning of video trace cannot be reliably locked to the horizontal synchronizing pulses of a video signal. In a display system using a cathode ray tube and a corresponding horizontal deflection system, the term scan locked is also appropriate.

It is therefore an aspect of this invention to provide a system for generating timing signals for a television apparatus wherein the horizontal scanning signal may not always be reliably locked to the horizontal synchronizing component of an incoming video signal. Such a system comprises a circuit for receiving a horizontal synchronizing component of an incoming video signal and generating an intermediate synchronizing signal synchronized with the horizontal synchronizing component. A horizontal deflection circuit is synchronized with the intermediate synchronizing signal and generates a scan synchronizing signal. A phase locked loop is synchronized with the horizontal deflection circuit. The phase locked loop has a frequency controllable oscillator for generating a clock signal, a phase detector and a filter for developing a control signal for the oscillator responsive to the phase detector. The phase detector has one input coupled for receiving the clock signal and another input coupled for receiving a clock synchronizing signal generated by the horizontal deflection circuit. A decoding circuit is responsive to the clock signal for generating first and second timing signals respectively synchronized with the horizontal synchronizing component and the intermediate synchronizing signal. A video processing circuit for the video signal is responsive to the first and second timing signals. The clock synchronizing signal may be related to the scan synchronizing signal or the horizontal deflection current. In particular, the clock synchronizing signal may be formed by the horizontal retrace pulses.

It is another aspect of the invention to provide a display locked oscillator for a progressive scanning system, the display locked oscillator being synchronized with an output signal of the horizontal deflection circuit, or a signal derived therefrom, for generating timing signals at a frequency corresponding to the frequency of a horizontal synchronizing component of an incoming video signal and at a multiple thereof, for example $1f_H$ and $2f_H$, which timing signals will exhibit negligible $1f_H$ ripple, if any. A master display locked oscillator can be implemented in accordance with this aspect of the invention only by providing, or recognizing, a suitable source of a substantially $1f_H$ ripple free $2f_H$ rate signal, for the illustrated example, to which the clock oscillator can be synchronized. Such a source of a $1f_H$ ripple free $2f_H$ timing signal is described in commonly owned and copending application (RCA 85,451). As noted in the copending application, a problem that may be encountered in generating a $2f_H$ timing signal from a $1f_H$ timing signal derived from the horizontal synchronizing component of a $1f_H$ video signal, is assuring sufficiently precise symmetry, or constancy, of the multiple frequency timing signal within the period of the basic frequency timing signal. The period of the multiple frequency signal may vary due to jitter caused by the basic frequency signal. If the symmetry of a $2f_H$ timing signal, for example, is not very precise within any $1f_H$ period, the $2f_H$ trace will be initiated at a different instant every other line in the raster. This can cause a split raster effect, wherein the raster has a first set of alternate scan lines forming a first picture portion which diverges to the right and a second set of alternate scan lines forming a second picture portion which diverges to the left. Adjacent retrace pulses are of different amplitude because different peak to peak yoke currents flow during adjacent trace periods. Different peak to peak yoke currents flow during adjacent trace periods because adjacent trace periods are of different length. The amount of the scanning difference between adjacent lines will depend on the magnitude of the period difference and the overall energy recovery efficiency of the deflection circuit. Time differences between adjacent trace periods on the order of only 100 nanoseconds may cause unacceptable amounts of raster splitting.

An asymmetry in the first synchronizing signal, for example at $1f_H$, can be introduced in the first phase locked loop used in the synchronizing circuits of horizontal deflection systems having two phase locked loops and forming part of a video speedup system. The asymmetry might be inherent in some integrated circuits as well. The absence of a $1f_H$ retrace signal from which to derive a feedback signal for the first phase locked loop at the $1f_H$ frequency, requires that the basic frequency timing signal be used as a feedback signal to the phase comparator in the phase locked loop. This can introduce ripple at the basic frequency, resulting in the asymmetry.

A solution described in the copending application may be embodied in a horizontal deflection system having accurate synchronizing circuits for use in displaying video signals at a multiple scanning rate, where an asymmetry stems from a periodic perturbation of a synchronizing or timing signal. There, a first phase locked loop generates a first timing signal at a first horizontal synchronizing frequency corresponding to a horizontal synchronizing component in a video signal. A converter circuit derives from the first timing signal a second timing signal, having a second frequency at a multiple of the first frequency and subject to a variation in frequency at a rate corresponding to the first frequency. A second phase locked loop receives the second timing signal and a feedback signal at the second frequency, and includes a voltage controlled oscillator for generating a smooth horizontal synchronizing signal at the second frequency. The second phase locked loop has a characteristic loop response preventing the voltage controlled oscillator from changing frequency as fast as the rate of variation of the second timing signal. A horizontal output deflection stage may be coupled to the second phase locked loop for synchronized horizontal scanning in accordance with the second frequency, for example $2f_H$. The two phase locked loops are configured in tandem, in conjunction with the signal rate converter, or multiplier. No additional signal processing circuitry is needed to correct the symmetry of the timing signal generated by the first phase locked loop or the symmetry of the multiple rate timing signal derived by the converter.

In accordance with this aspect of this invention, a system for generating timing signals for a progressive scanning television receiver comprises a circuit for receiving a video signal with a horizontal synchronizing component at a horizontal scanning frequency and generating an intermediate synchronizing signal at a multiple frequency of the horizontal synchronizing component. A horizontal deflection circuit generates a scan synchronizing signal at the multiple frequency, synchronized with the intermediate synchronizing signal. An oscillator generates a clock signal, synchronously with the scan synchronizing signal. A multiple stage counter divides the clock signal, producing a plurality of decodable outputs. A decoding circuit generates timing signals both at the frequency of the horizontal synchronizing component and at the multiple frequency from the outputs of the counting means.

Progressive scanning systems can be subject to another problem, stemming from the absence of retrace pulses at the basic, or $1f_H$, frequency. Multiple frequency scanning produces more flyback pulses than video line intervals in the video signal. The write circuit, for example, which should store each complete line of video as it is received, will store the end of one line and the beginning of the next line of video information if the write circuit is sychronized with the wrong flyback pulses, rather than the flyback pulses which occur at the beginning of each video line interval. In a $1f_H$ to $2f_H$ conversion, for example, the $2f_H$ horizontal deflection circuit generates twice as many flyback pulses as would a $1f_H$ horizontal deflection circuit. An ambiguity exists in the timing of the $1f_H$ timing signal derived from the master video clock oscillator, because it is not known which of the flyback pulses, occurring at the $2f_H$ rate, occur near the beginning of the $1f_H$ video line intervals and which occur near the middle of the video line intervals.

It is another aspect of this invention to resolve the ambiguity, enabling reliance on the timing signals derived from a display locked clock oscillator. In accordance with this aspect of the invention, a circuit coupled to the counter and the decoding circuit associates certain pulses of the clock signal with commencement of video line intervals in the video signal. This pulse associating circuit may also be thought of as forming part of the decoding circuit. In a first embodiment, a drive signal at the frequency of the horizontal synchronizing component and locked thereto, is sampled by the clock signal at the multiple rate, for example with a D-type flip/flop. The output of the flip/flop will alternate between high (HI) and low (LO) digital levels on successive half periods of the basic frequency drive signal. This output can be used as a most significant bit for decoding those timing signals at the frequency of the horizontal synchronizing component. In an alternative embodiment, a divide by two counter, for example a synchronous counter, responsive to the clock signal and the outputs of the multiple stage counter, is used to produce an output used as the most significant bit. The leading edge of each pulse in the drive signal at the frequency of the horizontal synchronizing component is detected and used to reset the counter. In many cases, the counter will need to be reset only once during each operation of the circuit, if at all.

Figure 3:
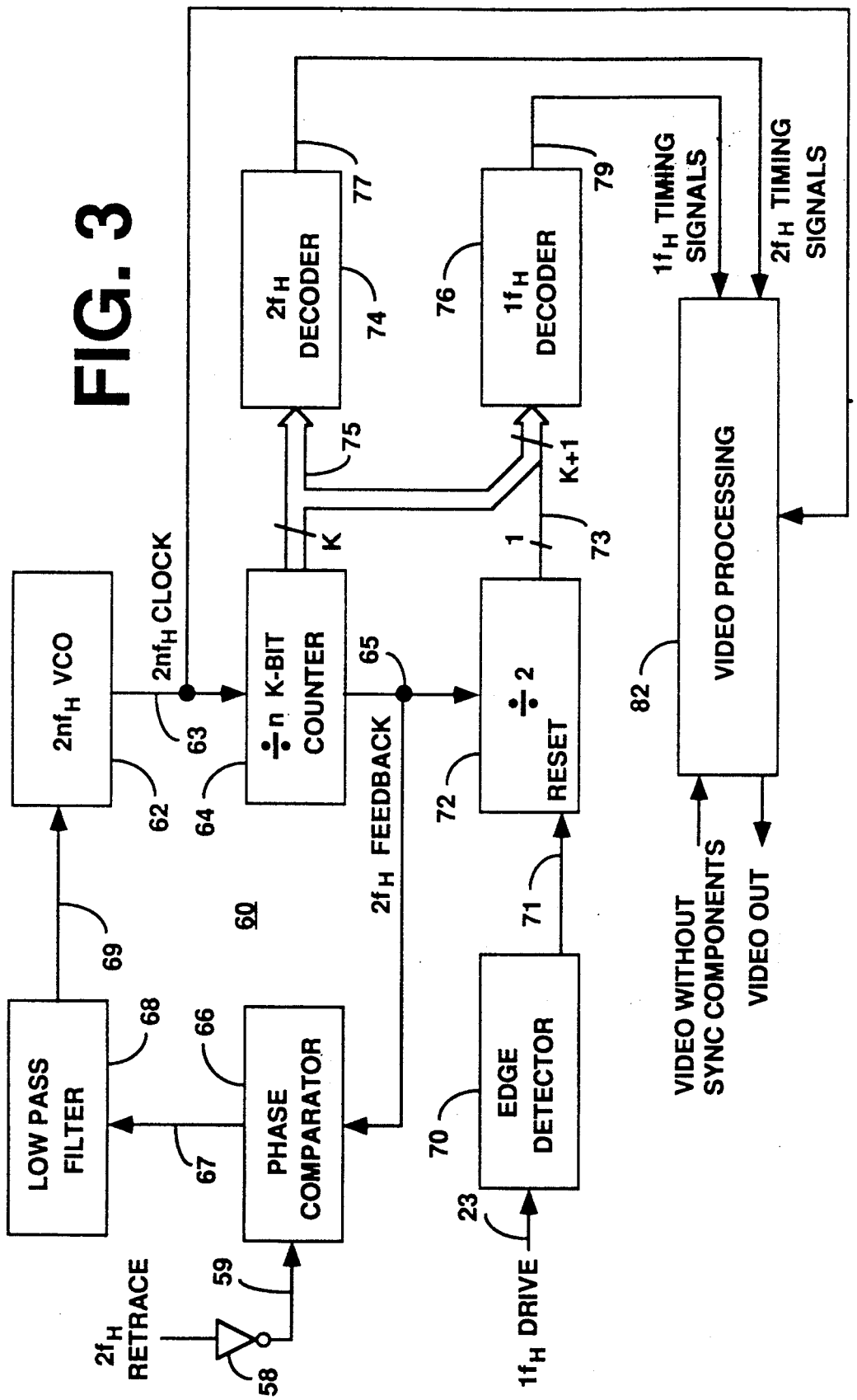
FIG. 3 is a block diagram of a display locked oscillator and a first decoding circuit.

FIGS. 4(a), 4(b), 4(c) and 4(d) form a timing diagram useful in explaining the operation of the oscillator and first decoding circuit shown in FIG. 3.

FIG. 5 is a block diagram of a display locked oscillator and a second decoding circuit.

FIGS. 6(a), 6(b) and 6(c) form a timing diagram useful in explaining the operation of the oscillator and second decoding circuit shown in FIG. 5.

Figure 1:
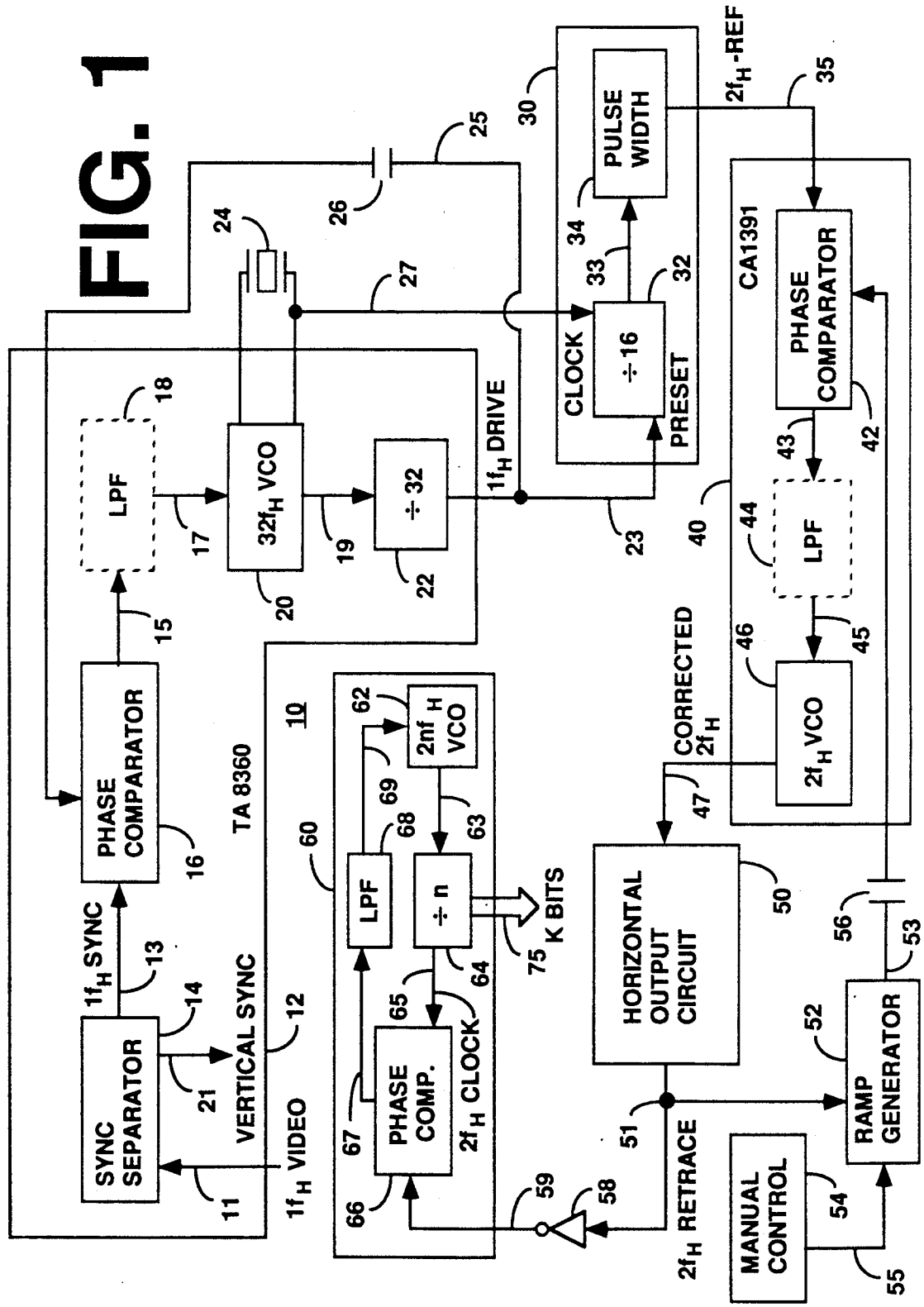
FIG. 1 is a block diagram of a horizontal deflection system having a display locked clock oscillator according to an aspect of this invention, used for converting $1f_H$ interlaced video signals for progressive scanning at $2f_H$.

A horizontal deflection system for providing $2f_H$ progressive scanning of a $1f_H$ video signal is shown in block diagram form in FIG. 1, and generally designated by reference numeral 10. A 1-chip 12 may be utilized for implementing a phase locked loop, which generates a first timing signal as an output, at a nominal $1f_H$ rate. Industry type TA8360, for example, is 1-chip incorporating a sync separator 14, a phase comparator 16 and a voltage controlled oscillator 20. A $1f_H$ video signal on line 11 is an input to sync separator 14. The sync separator 14 provides vertical synchronizing pulses on line 21 and $1f_H$ horizontal synchronizing pulses on line 13. The $1f_H$ synchronizing signals on line 13 are an input to phase comparator 16. The output of phase comparator 16 on line 15 is an error control signal input to low pass filter 18. The frequency characteristic of the low pass filter in the TA8360, for example, is determined primarily by external timing components. Accordingly, block 18 is shown by dashed lines. The external elements may be a series R-C network, having a 10 microfarad capacitor and a 3K resistor coupled between the capacitor and ground. Voltage controlled oscillator 20 operates at a $32f_H$ rate, responsive to a ceramic or L-C resonant circuit 24. A nominal $32f_H$ timing signal on line 19 is an input to a divide by 32 circuit 22. The output of the divide by 32 circuit on line 23 is a $1f_H$ drive signal. The $1f_H$ signal is an input on line 25 to the other input of phase comparator 16, which can result in the error control voltage for the $32f_H$ VCO being adversely modified by a $1f_H$ ripple. In the event the width of the $1f_H$ pulses being fed back to the phase comparator 16 are too wide, the pulse width can be reduced, for example by series coupled capacitor 26. The output of the resonant circuit 24 at $32f_H$ is also available externally of the 1-chip, on line 27.

A $2f_H$ frequency generator circuit 30 is coupled to the $1f_H$ output timing signal of the first phase locked loop by line 23 and to the resonant circuit 24 by line 27. Circuit 30 generates a timing signal designated $2f_H$-REF as an output on line 35. The $32f_H$ output of resonant circuit 24 on line 27 is coupled to the CLOCK input of a divide by 16 counter 32. Dividing a $32f_H$ signal by 16 results in a $2f_H$ signal. Other multiples of a basic horizontal scanning frequency can be produced by utilizing appropriate combinations of clock frequencies and division factors. The $1f_H$ timing signal on line 23 is coupled to the PRESET input of the counter 32. The divide by 16 counter 58 can be a 4-bit counter. The output signal of counter 32 on line 33, at $2f_H$, is an input to pulse width circuit 34, the output of which on line 35 is the $2f_H$-REF signal. Pulse width circuit 34 assures that the width of the pulses in the uncorrected $2f_H$-REF timing signal on line 35 will be wide enough to assure proper operation of a phase comparator in the second phase locked loop 40.

The $2f_H$-REF signal is symmetrical only to the extent that the initial duty cycle of the $1f_H$ signal is fifty percent. The effect of the $1f_H$ ripple on the error control voltage for the $32f_H$ VCO is a deviation from a fifty percent duty cycle. The error control voltage periodically falls during each $1f_H$ period. Accordingly, the output frequency $f_{VCO}$ of the $32f_H$ VCO falls periodically, during each $1f_H$ period. As the frequency falls, each subsequent output pulse from the $32f_H$ VCO has a lower frequency. As the frequency decreases, the pulse width $1/f_{VCO}$ increases. The divider circuit 32 doubles the frequency of the $1f_H$ signal, which has a period of 32 output pulses of the $32f_H$ VCO, by dividing the period in half, that is, into two sixteen pulse periods. However, due to the periodically increasing pulse widths, the aggregate width of the first sixteen pulses is less than the aggregate width of the next sixteen pulses. When the duration of sets of successive 16 pulses is not equal, the $2f_H$-REF timing signal is not symmetric within the period of the $1f_H$ signal, notwithstanding the precision of the digital divider. This asymmetry can cause retrace pulses of alternating amplitudes, which can result in raster splitting. The $2f_H$-REF signal generated by the digital circuit must therefore also be treated as an uncorrected signal, which requires further processing. Such an uncorrected signal is also unsuitable as a reference for generating $1f_H$ and $2f_H$ timing signals for the progressive video scanning circuit.

The $2f_H$-REF signal is further processed by a second phase locked loop 40. The second phase locked loop comprises phase comparator 42, low pass filter 44 and a voltage controlled oscillator 46. The phase locked loop 60 is embodied as an industry type CA1391. The error output signal of phase comparator 42 on line 43, as modified by low pass filter 44, is a control input for voltage controlled oscillator 46, which operates at a $2f_H$ rate and is denoted $2f_H$ VCO. The operating frequency of the oscillator and the frequency response of the low pass filter in a type CA1391 oscillator are primarily determined by external timing components. Accordingly, LPF 44 is shown by dashed lines. The frequency characteristic of the low pass filter 44 is determined by an external series R-C network formed, for example, by 1.5 microfarad capacitor C53 and 2K resistor R68. The output of voltage controlled oscillator 46 on line 47 provides CORRECTED $2f_H$ scan synchronizing signal for a horizontal output circuit 50. The output of the horizontal output circuit 50 on line 51 provides a $2f_H$ signal in the form of $2f_H$ RETRACE pulses. The $2f_H$ RETRACE pulses are an input to ramp generator 52. The output of ramp generator 52 on line 53 is AC coupled by capacitor 56 to the other input of phase comparator 42. A manual control circuit 54 has an output on line 55 for adjusting the phase delay of the $2f^H$ retrace pulses by adjusting the ramp generator 52.

Figure 2:
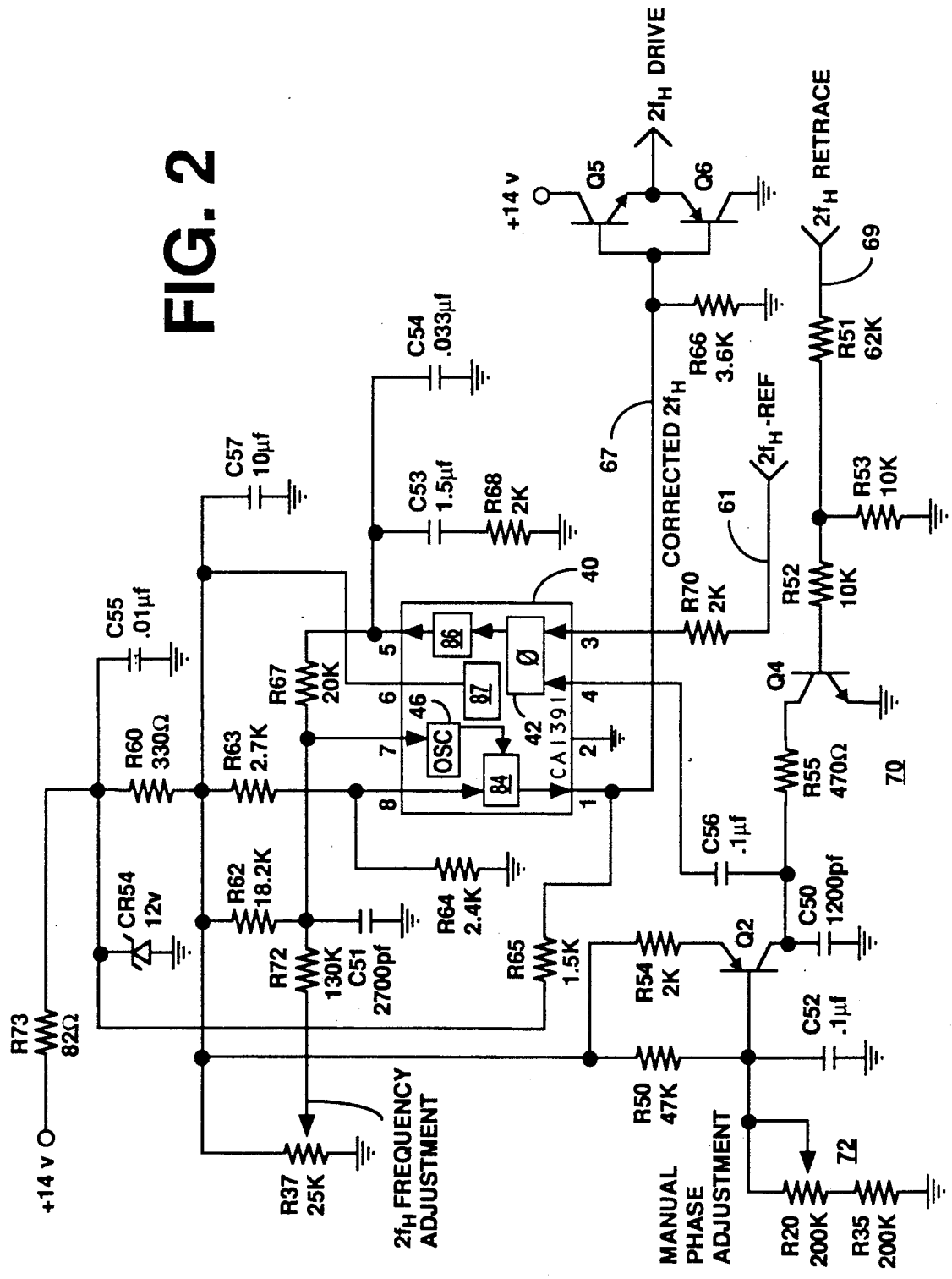
FIG. 2 is a circuit diagram showing a portion of the block diagram of FIG. 1 in more detail.

A circuit schematic for a portion of the block diagram shown in FIG. 1 is shown in FIG. 2. The phase locked loop 40, as a type CA1391 circuit, includes an oscillator 46, phase detector 42, predriver 84, phase detector output driver 86 and $V_{cc}$ voltage regulator 87. The oscillator 46 is an RC type with terminal 7 used to control frequency. An external capacitor C51 is connected from terminal 7 to ground and charges through external resistance R62 coupled between terminals 6 and 7. When the voltage at terminal 7 exceeds an internal potential bias, capacitor C51 is discharged through an internal resistor. This conduction causes generation of a drive pulse, which terminates when the capacitor is sufficiently discharged. Negative-going synchronizing pulses at terminal 3 are phase compared with the sawtooth waveform at terminal 4, which is derived from horizontal flyback or retrace pulses. If there is no phase difference between the synchronizing signal and the sawtooth waveform, there is no net output current at terminal 5. When a phase offset occurs, current flows either in or out of terminal 5 to correct the frequency. The duty cycle, or mark space ratio, of the predriver 84 may be adjusted by setting the potential at terminal 8. In the circuit of FIG. 2, this is determined by the voltage divider formed by resistors R63 and R64. Potentiometer R37, coupled to terminal 7 through resistor R72, may be used to manually adjust the frequency of oscillator 46.

The ramp generating circuit 70 comprises transistor Q4, resistor R55 and capacitor C50. The ramp signal generated across capacitor C50 is AC coupled to terminal 4 through capacitor C56. A transistor Q2 and potentiometer R20 form a manually operable delay circuit 72, which varies the current needed to charge the ramp capacitor. Variation of the time needed to charge capacitor C50 provides a variable delay of approximately from 0-2 microseconds in the relative phase of the $2f_H$-REF pulses and the CORRECTED $2f_H$ pulses.

The CORRECTED $2f_H$ output of predriver 84 on line 67 is an input to a push-pull driver circuit comprising transistors Q5 and Q6, which provides a $2f_H$ DRIVE output signal to the horizontal output circuit.

Referring again to FIG. 1, the $2f_H$ retrace signal on line 51 represents a substantially jitter free signal at the progressive scanning rate, $2f_H$, to which a clock oscillator may be conveniently display locked. The $2f_H$ retrace signal may be digitized, that is pulse shaped, for this use by inverter 58, having an output on line 59. Such a clock oscillator may be used for generating timing signals for use in converting the $1f_H$ interlaced video signal to a progressively scanned signal at $2f_H$. In accordance with an aspect of the invention, the inverted $2f_H$ retrace signal on line 59 is an input to a third phase locked loop 60. Phase locked loop 60 comprises a phase comparator 66, the output of which is modified by the characteristic response of low pass filter LPF 68 and provided as a control voltage to a $2nf_H$ voltage controlled oscillator $2nf_H$ VCO 62. Voltage controlled oscillator 62 may be responsive to an external resonant circuit similarly to voltage controlled oscillator 20. The output of voltage controlled oscillator 62 is a $2nf_H$ CLOCK signal on line 63. The $2nf_H$ CLOCK signal is an input to a divide by n, K bit counter 64 and an input to a VIDEO PROCESSING circuit 82, shown in FIGS. 3 and 5. VIDEO PROCESSING circuit 82 may be an interlaced format to progressive format conversion circuit, which utilizes a plurality of control and clock signals, as is well known. These signals include, for example, writing and clamping signals at the $1f_H$ rate and reading and blanking signals at the $2f_H$ rate. An output of the counter on line 65 is the other input to phase comparator 66. Counter 64 also has a set of K outputs designated by reference numeral 75. The third phase locked loop 60 forms the master clock oscillator referred to generally above, and provides a synchronous display locked source of timing signals for the conversion of the interlaced video signal.

Multiple frequency scanning produces more flyback pulses than video line intervals in the video signal. In a $1f_H$ to $2f_H$ conversion, for example, the $2f_H$ horizontal deflection circuit generates twice as many flyback pulses as would a $1f_H$ horizontal deflection circuit. An ambiguity exists in the timing of the $1f_H$ timing signal derived from the common clock oscillator, because it is not known which of the flyback pulses, occurring at the $2f_H$ rate, correspond to commencement of the $1f_H$ video line intervals and which correspond to the middle of the video line intervals. The write circuit, for example, which should store each complete line of video as it is received, will store the end of one line and the beginning of the next line of video information, if the write circuit is synchronized with the wrong flyback pulses, rather than the flyback pulses which occur at the beginning of each video line interval. A decoding circuit including a first means for resolving the ambiguity of the $2f_H$ retrace signal relative to the beginning of the $1f_H$ video line intervals is shown in FIG. 3. A decoding circuit including an alternative embodiment for resolving the ambiguity of the $2f_H$ retrace signal relative to the beginning of the $1f_H$ video line intervals is shown in FIG. 5. In each case, the third phase locked loop 60 is also shown. Also in each case, the $1f_H$ DRIVE signal may be taken from the output of the first phase locked loop on line 23 in FIG. 1. Such a signal should be available in other circuits, wherein a different means than that shown in FIGS. 1 and 2 is utilized to generate a substantially ripple free multiple rate scan synchronizing signal line locked to an incoming video signal.

With reference to FIG. 3, the counter 64 of phase locked loop 60 has a $2f_H$ FEEDBACK signal output on line 65. The feedback signal is an input to phase comparator 66 and an input to a divide by 2 counter 72. Counter 64 is a K-bit counter, having K stages each having an output available for decoding. The set of K output lines is designated by reference numeral 75. Various timing signals on lines 77 and 79 are processed and generated by $2f_H$ decoder 74 and $1f_H$ decoder 76 respectively. The decoders receive outputs from each of the K stages of the K-bit counter. Certain timing signals might be specific counts, for example the fifth or tenth clock pulse of each cycle. Other timing pulse might use specific counts to initiate and terminate timing signals, for example beginning at the start of the seventh clock pulse and terminating at the end of the twenty fifth clock pulse. The illustrative clock pulses are arbitrary. The resolution of the decoders is limited only by the actual number of bits and the frequency of the master clock signal. The timing signals are used by the VIDEO PROCESSING circuit, for example an interlaced to progressive format scanning conversion circuit, for converting the interlaced video signal, without synchronizing components, to a format appropriate for progressive scanning and for displaying the converted video at the progressive rate.

The ambiguity which exists in the timing of the $1f_H$ signal derived from the master clock oscillator can be appreciated from further reference to FIGS. 4(a) through 4(d). FIG. 4(a) shows $1f_H$ drive pulses, which are synchronized to the horizontal synchronizing component of the incoming video $1f_H$ video signal. Each pulse period $1/1f_H$ includes pulse parts A and B. The leading, positive going, edge of pulse part A corresponds to the beginning of each video line interval. FIG. 4(b) shows the $2f_H$ FEEDBACK signal generated by counter 64 on line 65. Two sets of alternate clock pulses are designated by reference letters C and D respectively. Each clock pulse in each set corresponds to a $2f_H$ horizontal flyback pulse. Each pulse period $\frac{1}{2}f_H$ includes one of the C or D pulses. The phase relationship between the waveforms of FIGS. 4(a) and 4(b) is arbitrary, but illustrative. Pulses C are the clock pulses which occur near the beginning of each video line interval. Pulses D are the clock pulses which occur near the middle of each video line interval. The output of the divide by 2 counter 72 is shown in FIG. 4(c). This waveform is used by decoder 76 as a supplemental decodable bit, for example a most significant bit. The waveform should be a logical HI for the duration of that one of the the $2f_H$ FEEDBACK pulses that corresponds to the beginning of the video line intervals. Edge detector 70 provides an output pulse to reset divide by 2 counter 72 at each leading or positive going edge of the $1f_H$ DRIVE signal. The reset pulses are shown in FIG. 4(d). Prior to reset pulse I, as may happen by chance and for purposes of illustration, the output of the divide by 2 counter is a logical LO during the C pulses and a logical HI during the D pulses. This is the opposite of what is required for proper decoding. Reset pulse I resets the output of the divide by 2 counter to a logical LO at time t1. The output goes to a logical HI at the leading edge of the next $2f_H$ FEEDBACK pulse at time t2, which is a C pulse, as required. Thereafter, subsequent reset pulses such as J and K occur at times t3 and t4 respectively, when the output is already a logical LO. These reset pulses have no effect. However, subsequent reset pulses will be effective to restore proper resolution of the ambiguity, should the circuit be interrupted in a fashion which reverses the output, as before reset pulse I. This embodiment is advantageous in that the timing signals will continue to be generated even if the $1f_H$ DRIVE signal is interrupted. The embodiment is also advantageous in that the circuit is relatively insensitive to the duty cycle of the $1f_H$ DRIVE signal.

An alternative embodiment is shown in FIG. 5. A D type flip/flop 80 is used instead of the synchronous counter 72 and edge detector 70. The $1f_H$ DRIVE signal is coupled to the D input of the flip/flop. The $1f_H$ DRIVE signal is sampled by the $2f_H$ FEEDBACK signal, coupled to the clock input CLK of the flip/flop. The Q output of flip/flop 80 is used as a supplemental decodable bit, for example a most significant bit, by the $1f_H$ decoder 76. The operation of this sampling circuit is shown in FIGS. 6(a), 6(b) and 6(c). The same $1f_H$ DRIVE signal is shown in FIG. 6(a) and the same $2f_H$ FEEDBACK signal is shown in FIG. 6(b), as shown in FIGS. 4(a) and 4(b) respectively. The $1f_H$ DRIVE signal is sampled at the leading edge of each $2f_H$ FEEDBACK pulse, shown as times t1, t2, t3, t4, t5 and t6. The Q output of flip/flop 80 is shown in FIG. 6(c). At times t1, t3 and t5 the $1f_H$ DRIVE signal is a logical HI and the Q output is changed to a logical HI. At times t2, t4 and t6 the $1f_H$ DRIVE signal is a logical LO and the Q output is changed to a logical LO. As seen in FIG. 6(c), the Q output is a logical HI for each $2f_H$ FEEDBACK pulse which occurs at the leading edge of the $1f_H$ DRIVE signal, which corresponds to the beginning of the video line interval, as required by the decoder. The duty cycle of the $1f_H$ DRIVE signal must be close enough to 50% that the signal is still a logical HI when the proper $2f_H$ FEEDBACK pulse triggers the flip/flop. This embodiment is advantageous in that only a single circuit component is required, and in that a single flip/flop may be easier to implement in an integrated circuit than a synchronous counter and edge detector.

Aspects of the invention are also useful in situations where progressive scanning is not necessarily involved. Television apparatus are sometimes provided with a video processing circuit can require video signals to be digitally processed, for example being written into a memory and stored temporarily, prior to being read out of memory onto the television or monitor screen. In this case, the video lines must be written into memory in synchronism with the incoming video signal, but the video lines must be read out of memory in synchronism with the horizontal deflection circuit. This has been done indirectly in the past, by trying to assure synchronization between the retrace pulses and the incoming video signal. Other video processing circuits provide on screen displays, wherein characters stored in memory are displayed simultaneously with the display resulting from the incoming video signal, or sometimes during a blank screen when no video signal is present.

When a conventional line locked clock is synchronized to the incoming video signal, various jitter conditions in the deflection circuit, caused for example by variations in beam current loading, can disturb the registration, or time coincidence, of the beginning of each horizontal trace and the beginning of the video line being scanned. Stating the problem in other terms, it sometimes happens that the horizontal deflection system, particularly the horizontal retrace pulses, cannot be reliably locked to the horizontal synchronizing pulses of a video signal. This can be so even if the oscillator which generates the deflection current, as part of a phase locked loop, is itself locked to the proper frequency. Generally speaking, the phase locked loop may be incapable of responding to certain errors, for example in small numbers of lines due to jitter of the retrace pulses. Rather, the phase locked loop is more likely to respond to an average deviation over a larger number of video lines, as is the nature of many phase locked loops in a horizontal deflection circuit.

In accordance with an aspect of this invention, a display locked master video clock can form part of a phase locked loop synchronized with a clock synchronizing signal derived from the horizontal deflection current. One example of a signal derived from the horizontal deflection current is the scan synchronizing signal. Another example is a signal formed by horizontal retrace pulses. A signal formed by horizontal retrace pulses may be pulse shaped, for example, as by inverter 58 in FIG. 1.

What is claimed is:

1. A system for generating timing signals for a television receiver, comprising:
   a circuit for receiving a video signal with a horizontal synchronizing component at a horizontal scanning frequency and generating an intermediate synchronizing signal at a multiple frequency of said horizontal synchronizing component;
   a horizontal deflection circuit for generating a scan synchronizing signal at said multiple frequency, synchronized with said intermediate synchronizing signal;
   oscillating means for generating a clock signal synchronously with said scan synchronizing signal;
   counting means for dividing said clock signal;
   means for decoding timing signals at said frequency of said horizontal synchronizing component and at said multiple frequency from outputs of said counting means; and,
   means coupled to said counting means and said decoding means for associating certain pulses of said clock signal with commencement of video line intervals in said video signal.

2. The system of claim 1, wherein said means for associating certain pulses generates an output signal to said decoding means, used as a decodable bit for decoding said timing signals at said frequency of said horizontal synchronizing component.

3. The system of claim 2, wherein said means for associating certain pulses comprises a circuit for sampling a drive signal at said frequency of said horizontal synchronizing component by said clock signal at said multiple frequency to generate said output signal.

4. The system of claim 1, wherein said means for associating certain pulses comprises a circuit for sampling a drive signal at said frequency of said horizontal synchronizing component by said clock signal at said multiple frequency, said sampling circuit generating an output signal to said decoding means, used as a decodable bit for decoding said timing signals at said frequency of said horizontal synchronizing component.

5. The system of claim 2, wherein said means for associating certain pulses comprises:
   a divide by two counter responsive to said clock signal to generate said output signal; and,
   a detector for leading edges of a drive signal at said frequency of said horizontal synchronizing component, for resetting said divide by two counter.

6. The system of claim 1, wherein said means for associating certain pulses comprises:
   a divide by two counter responsive to said clock signal to generate an output signal to said decoding means, used as a decodable bit for decoding said timing signals at said frequency of said horizontal synchronizing component; and,
   a detector for leading edges of a drive signal at said frequency of said horizontal synchronizing component, for resetting said divide by two counter.

7. The system of claim 1, wherein said circuit for receiving a video signal comprises;
   a first phase locked loop operating at, and generating a first drive signal at said frequency of said horizontal synchronizing component;
   means responsive to said first drive signal for generating a second drive signal at said multiple frequency.

8. The system of claim 7, wherein said horizontal deflection circuit comprises a second phase locked loop, operating at said multiple frequency.

9. The system of claim 1, wherein said horizontal deflection circuit comprises a phase locked loop operating at said multiple frequency.

10. The system of claim 8, wherein said oscillating means and said counting means form part of a third phase locked loop, operating at said multiple frequency.

11. The system of claim 1, wherein said oscillating means and said counting means form part of a phase locked loop operating at said multiple frequency.

12. A system for generating timing signals for a television receiver, comprising:
   a first phase locked loop for receiving a video signal with a horizontal synchronizing component at a horizontal scanning frequency, operating at and generating a first drive signal at said frequency of said horizontal synchronizing component;
   means responsive to said first drive signal for generating a second drive signal at a multiple frequency of said horizontal synchronizing component;
   a second phase locked loop operating at said multiple frequency and generating a scan synchronizing signal synchronously with said second drive signal;
   a third phase locked loop having oscillating means for generating a clock signal synchronously with said scan synchronizing signal, and counting means for dividing said clock signal; and,
   means for decoding timing signals, at said frequency of said horizontal synchronizing component and at said multiple frequency, from outputs of said counting means.

13. The system of claim 12, further comprising a video speed up circuit responsive to said timing signals.

14. The system of claim 12, wherein said decoding means comprises means coupled to said counting means for associating certain pulses of said clock signal with commencement of video line intervals in said video signal.

15. The system of claim 14, wherein said means for associating certain pulses comprises a circuit for sampling said first drive signal by said clock signal, said sampling circuit generating an output signal used by said decoding means as a decodable bit for decoding said timing signals at said frequency of said horizontal synchronizing component.

16. The system of claim 15, wherein said sampling circuit comprises a D type flip/flop, having a D input coupled to said first drive signal and a clock input coupled to said clock signal.

17. The system of claim 14, wherein said means for associating certain pulses comprises:
   a divide by two counter responsive to said clock signal to generate said output signal used by said decoding means as a decodable bit for decoding said timing signals at said frequency of said horizontal synchronizing component; and,
   a detector for leading edges of a drive signal at said frequency of said horizontal synchronizing component, for resetting said divide by two counter.

18. A system for generating a master clock signal in a television receiver, comprising:
   a video processing circuit for information in a video signal responsive to a first timing signal having a frequency corresponding to a horizontal synchronizing component of said video signal and a second timing signal having a frequency corresponding to a multiple of said horizontal synchronizing component;
   a horizontal deflection circuit operating synchronously with said horizontal synchronizing component and generating a scan synchronizing signal at said second frequency;
   a phase locked loop operating synchronously with said horizontal synchronizing component and said scan synchronizing signal, having frequency controllable means for generating a master clock signal, a phase detector and a filter for developing a control signal for said frequency controllable means responsive to said phase detector, said phase detector having one input coupled for receiving said clock signal and another input coupled for receiving a master clock synchronizing signal generated by said horizontal deflection circuit; and,
   means responsive to said clock signal for generating said first and second timing signals.

19. The system of claim 18, further comprising:
   counting means for dividing said clock signal; and,
   means for decoding said first and second timing signals from outputs of said counting means.

20. The system of claim 19, further comprising means coupled to said counting means and said decoding means for associating certain pulses of said clock signal with commencement of video line intervals in said video signal.

21. The system of claim 18, wherein said master clock synchronizing signal is derived from retrace pulses at said multiple frequency.

22. The system of claim 18, wherein said master clock synchronizing signal is derived from said scan synchronizing signal at said multiple frequency.

23. The system of claim 18, wherein said frequency controllable means comprises:
   counting means for dividing said clock signal;
   means for decoding timing signals at said frequency of said horizontal synchronizing component and at said multiple frequency from outputs of said counting means; and,
   means coupled to said counting means and said decoding means for associating certain pulses of said clock signal with commencement of video line intervals in said video signal.

24. A system for generating a display locked master clock signal in a television apparatus, comprising:
   means for receiving a horizontal synchronizing component of an incoming video signal and generating an intermediate synchronizing signal synchronized with said horizontal synchronizing component;
   a horizontal deflection circuit synchronized with said intermediate synchronizing signal and generating a horizontal deflection current resulting in trace and retrace pulses, some of said pulses being subject to phase variation relative to said horizontal synchronizing component of said incoming video signal;
   a phase locked loop synchronized with said horizontal deflection circuit, having frequency controllable means for generating a display locked master clock signal, a phase detector and a filter for developing a control signal for said frequency controllable means responsive to said phase detector, said phase detector having one input coupled for receiving said master clock signal and another input coupled for receiving a clock synchronizing signal derived from said horizontal deflection current;
   decoding means responsive to said display locked clock signal for generating a display locked timing signal; and,
   a video processing circuit for said video signal responsive to said timing signal.

25. The system of claim 24, comprising means responsive to said horizontal deflection current for producing a scan synchronizing signal having a frequency which is a multiple of the frequency of the horizontal synchronizing component.

26. The system of claim 24, comprising means responsive to said horizontal deflection current for producing a scan synchronizing signal, said clock synchronizing signal being derived from said scan synchronizing signal.

27. The system of claim 24, wherein said clock synchronizing signal is formed by said horizontal retrace pulses.

* * * * *